(12) United States Patent
Lee

(10) Patent No.: US 7,495,402 B2
(45) Date of Patent: Feb. 24, 2009

(54) FAN MOTOR CONTROLLER

(75) Inventor: Hsien-Meng Lee, No. 82-1, Jaokuei 1st. St., Hsitun Dist., Taichung City (TW)

(73) Assignees: Hsien-Meng Lee, Taichung (TW); Air Cool Industrial Co., Ltd., Taichung County (TW)

( * ) Notice: Subject to any disclaimer, the term of this patent is extended or adjusted under 35 U.S.C. 154(b) by 207 days.

(21) Appl. No.: 11/708,328

(22) Filed: Feb. 21, 2007

(65) Prior Publication Data

US 2008/0199159 A1    Aug. 21, 2008

(51) Int. Cl.
*H02P 6/00* (2006.01)
*H02P 6/14* (2006.01)

(52) U.S. Cl. ............... 318/400.01; 318/400.34; 318/400.35; 388/815

(58) Field of Classification Search ............. 318/400.01
See application file for complete search history.

(56) References Cited

U.S. PATENT DOCUMENTS

| | | | |
|---|---|---|---|
| 5,847,530 A * | 12/1998 | Hill ............................. | 318/599 |
| 2004/0007998 A1 * | 1/2004 | Yasohara et al. ............ | 318/437 |
| 2004/0041530 A1 * | 3/2004 | Peterson ..................... | 318/254 |
| 2004/0251860 A1 * | 12/2004 | Ehsani et al. ................ | 318/254 |

* cited by examiner

*Primary Examiner*—Walter Benson
*Assistant Examiner*—Erick Glass
(74) *Attorney, Agent, or Firm*—Rosenberg, Klein & Lee

(57) ABSTRACT

A fan motor controller comprised of a power supply unit, three driving circuits, three power output circuits, a microprocessor, a voltage raising and compensation circuit, a Back-EMF sensing circuit, a current-limit protection circuit, and a speed control circuit. The fan motor controller eliminates the use of a Hall sensor, enables the field effect power transistor of the works in full conduction of each power output circuit to work in full conduction so as to lower the temperature.

1 Claim, 5 Drawing Sheets

FAN MOTOR CONTROLLER

BACKGROUND OF THE INVENTION

1. Field of the Invention

The present invention relates fan motor controllers and more particularly, to a small-sized fan motor controller, which eliminates the use of a Hall sensor and is inexpensive to manufacture.

2. Description of the Related Art

Conventional fan motor controllers commonly have the following drawbacks:

1. A Hall sensor is used to detect the polarity address of the rotor of the fan motor for speed control. The use of the Hall sensor greatly increases the cost of the fan motor controller. Further, the installation of the Hall sensor is complicated.

2. The high potential field effect power transistor for driving the fan motor is not in full conduction during working. Therefore, the high potential field effect power transistor wastes much power supply, and the temperature of the high potential field effect power transistor is high during its working.

SUMMARY OF THE INVENTION

The present invention has been accomplished under the circumstances in view. It is therefore one object of the present invention to provide a fan motor controller, which eliminates the use of a Hall sensor. It is another object of the present invention to provide a fan motor controller, which has a small size and is inexpensive to manufacture.

To achieve these and other objects of the present invention, the fan motor controller comprises a power supply unit adapted to provide the necessary working voltage for component parts of the fan motor controller; three driving circuits electrically connected to the microprocessor, the driving circuits each having two transistors; three power output circuits respectively electrically connecting the driving circuits to a brushless motor, the power output circuits each comprised of a transistor and a field effect power transistor, the transistors of the power output circuits being turned on/off by means of on/off action of the transistors of the driving circuits so that the field effect power transistors of the power output circuits are turned on/off to control forward/reverse operation of the brushless motor; a microprocessor adapted to receive control signals and to output control signals to the driving circuits; a voltage raising and compensation circuit, the voltage raising and compensation circuit being comprised of a plurality of transistors, resistors, capacitors and diodes, and adapted to raise the voltage of the power supply unit and to provide raised voltage to the driving circuits for driving the field effect power transistors; a back-EMF sensing circuit, the back-EMF sensing circuit being comprised of three operational amplifiers electrically connected to the brushless motor and the microprocessor to detect the polarity address of the rotor of the brushless motor and to output the detected signal to the microprocessor for digital signal control.

DESCRIPTION OF THE RELATED ART

DETAILED DESCRIPTION OF THE PREFERRED EMBODIMENT

Figure 1:
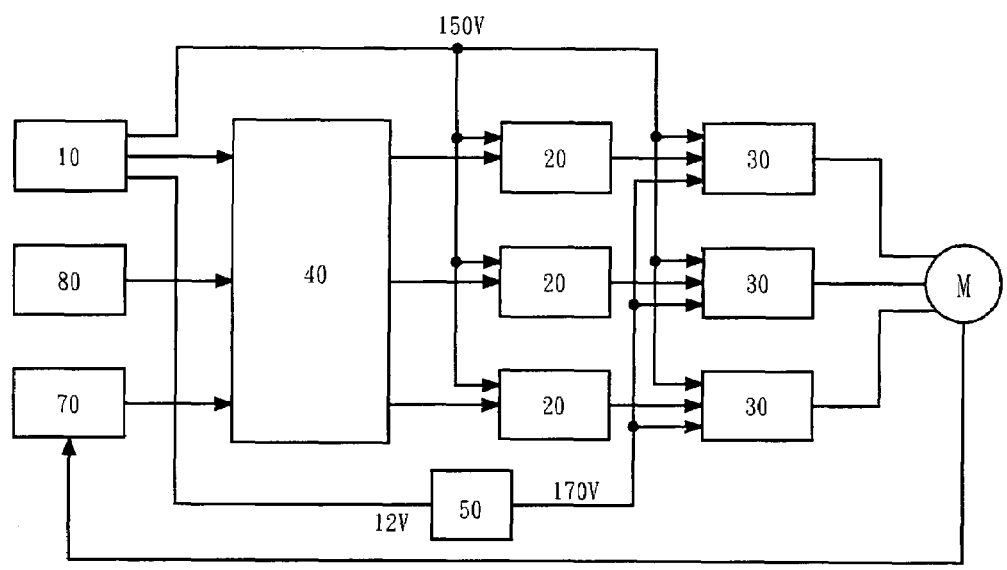
FIG. 1 is a system block diagram of a fan motor controller according to the present invention.
Figure 2:
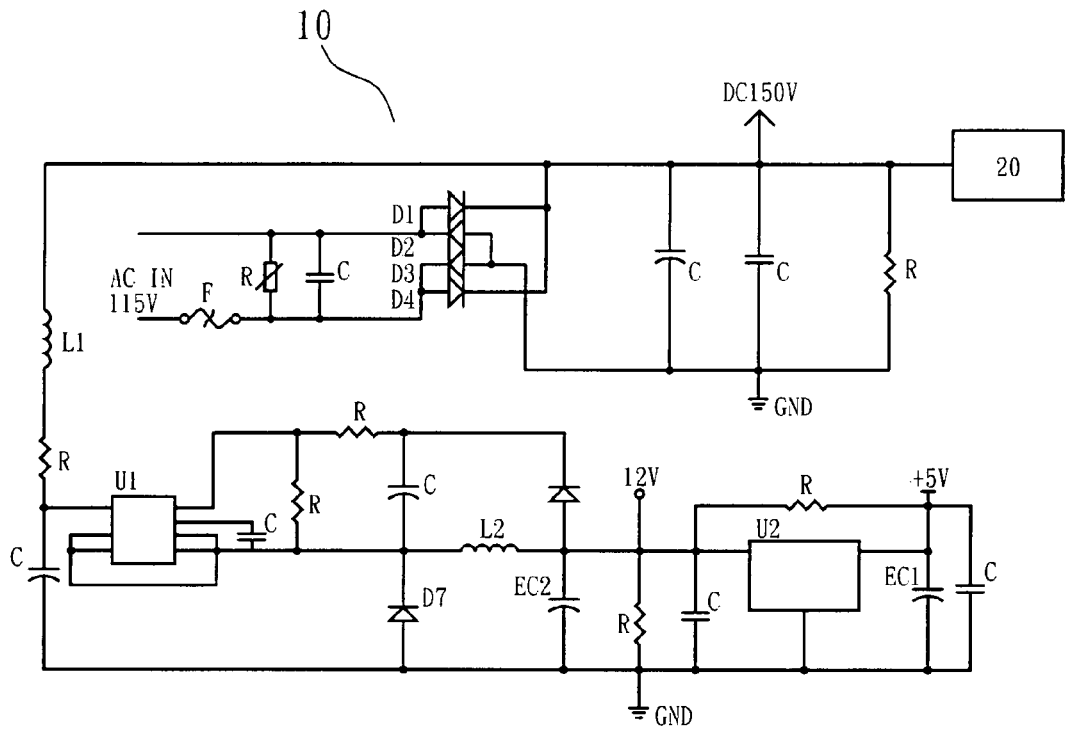
FIG. 2 is a circuit diagram of the power supply unit of the fan motor controller according to the present invention.
Figure 3:
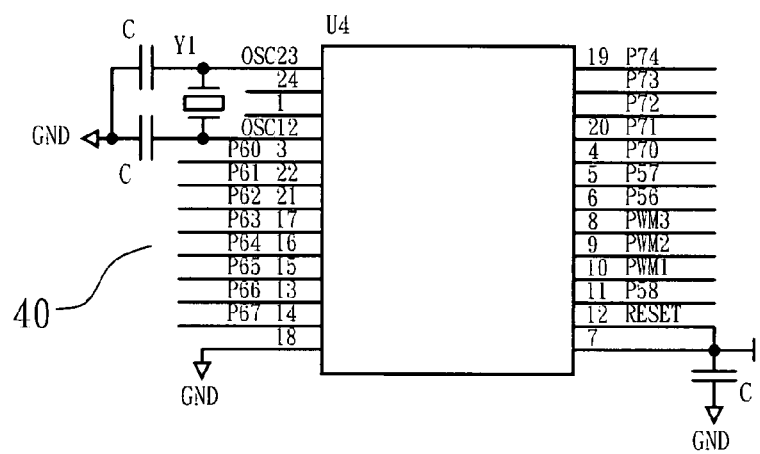
FIG. 3 is a circuit diagram of the microprocessor of the fan motor controller according to the present invention.

Referring to FIGS. 1~8, a fan motor controller in accordance with the present invention is shown comprised of a power supply unit 10, three driving circuits 20, three power output circuits 30, a microprocessor 40, a voltage raising and compensation circuit 50, a Back-EMF sensing circuit 60, a current-limit protection circuit 70, a speed control circuit 80.

The power supply unit 10 (see FIG. 2) is adapted to provide a low voltage 12V~5V and a high voltage 150V for the component circuits of the fan motor controller.

Figure 4:
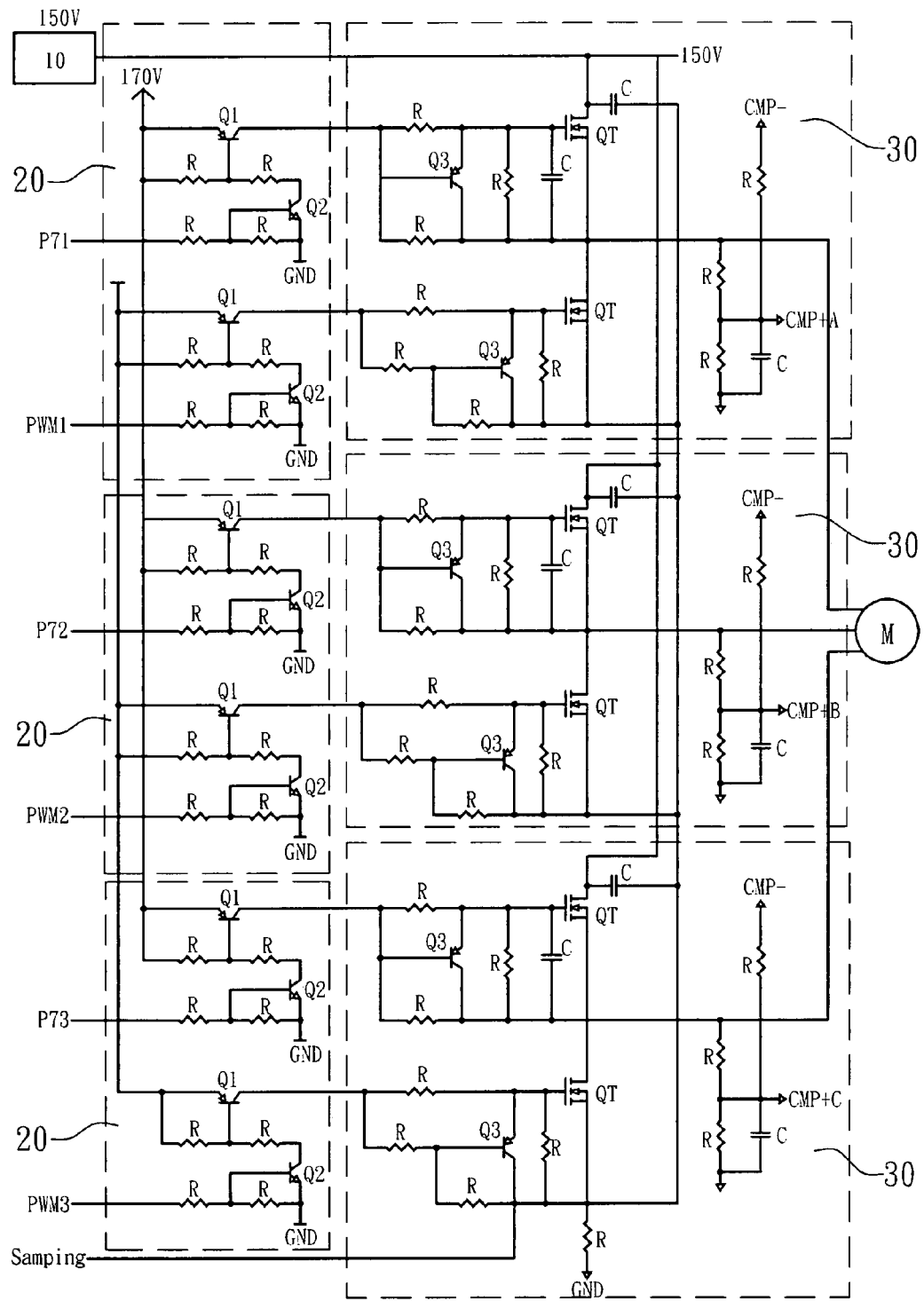
FIG. 4 is a circuit diagram of the driving circuits and power output circuits of the fan motor controller according to the present invention.

The three driving circuits 20 are electrically connected to the microprocessor 40, each having two transistors Q1 and Q2 respectively connected to the associating power output circuits 30 (see FIG. 4).

The three power output circuits 30 is electrically connected to a brushless motor M, each comprised of a transistor Q3 and a field effect power transistor QT (see FIG. 4). By means of On/Off action of the transistors Q1 and Q2 of the driving circuits 20 to control On/Off of the transistors Q3 of the power output circuits 30, the field effect power transistors QT are turned on/off to control forward/reverse operation of the brushless motor M.

The microprocessor 40 (see FIG. 3) has memory, algorithm, and decoding functions, adapted to receive control signals and to output control signals to the driving circuits 20.

The voltage raising and compensation circuit 50 (see FIG. 5) is comprised of transistors Q4, Q5, Q6, resistors, capacitors, and diodes, and adapted to raise 12V and add raised voltage to 150V so as to provide 170V to the power output circuits 30 for driving the field effect power transistors QT.

The Back-EMF sensing circuit 60 (see FIG. 6) comprises three operational amplifiers U1, U2, U3 electrically connected to the brushless motor M and the microprocessor 40 to detect the polarity address of the rotor of the brushless motor M and to output the detected signal to the microprocessor 40 for digital signal control.

The current-limit protection circuit 70 (see FIG. 7) comprises an operational amplifier U4 electrically connected to the complete current of the field effect power transistor QT to detect the level of the current. When the current at the field effect power transistor QT surpassed a predetermined high level, the current-limit protection circuit 70 cuts off power supply from the microprocessor 40, preventing burnout.

The speed control circuit 80 (see FIG. 8) is electrically connected to the microprocessor 40, and comprised of resistors, capacitors, diodes, and a selector J1. By means of the selector J1, the user can control the speed of the brushless motor M.

The operation of the present invention is outlined hereinafter. When ON, the microprocessor 40 outputs a control signal to the driving circuits 20 to set the brushless motor M into position. At the same time, the Back-EMF sensing circuit 60 detects the polarity address of the rotor of the brushless motor M, and outputs the detected signal to the microprocessor 40 for operation control.

Figure 5:
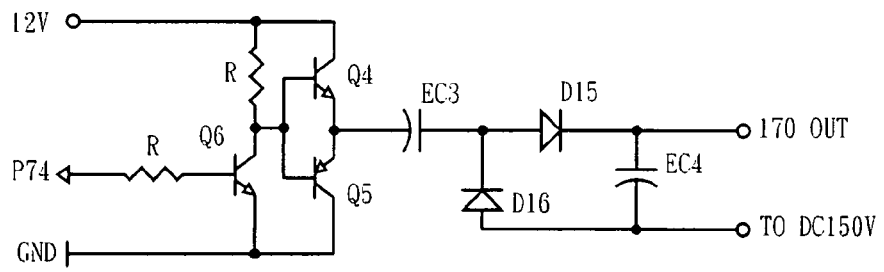
FIG. 5 is a circuit diagram of the voltage raising and compensation circuit of the fan motor controller according to the present invention.
Figure 6:
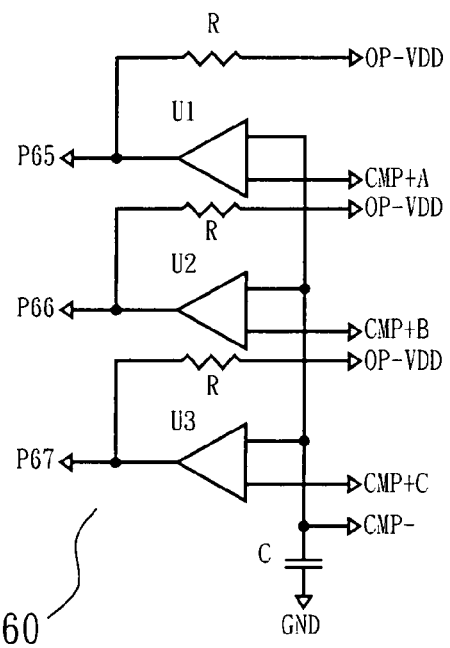
FIG. 6 is a circuit diagram of the Back-EMF sensing circuit of the fan motor controller according to the present invention.
Figure 7:
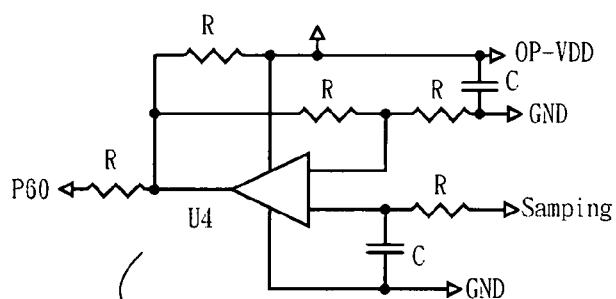
FIG. 7 is a circuit diagram of the current-limit protection circuit of the fan motor controller according to the present invention.
Figure 8:
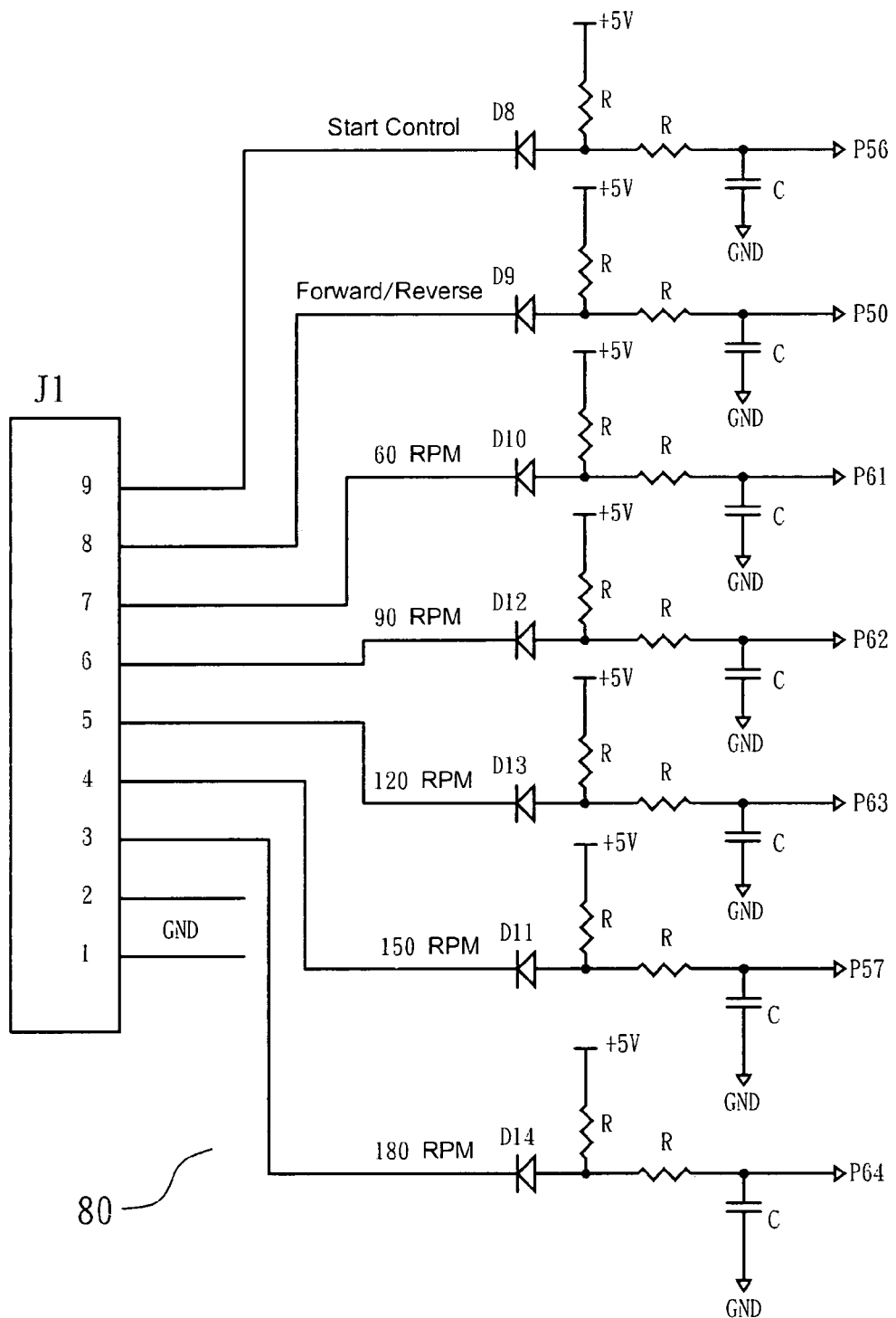
FIG. 8 is a circuit diagram of the speed control circuit of the fan motor controller according to the present invention.

During operation, the invention has the following features:
1. The field effect power transistor QT works in full conduction:
   As shown in FIG. 5, the voltage raising and compensation circuit 50 raises 150V of the power supply unit 10 to 170V for driving the field effect power transistor QT, so that the field effect power transistor QT is in full conduction to lower the temperature.
2. It makes EMF measurement for digital signal control:
   As shown in FIG. 6, the Back-EMF sensing circuit 60 is comprised of three operational amplifiers U1, U2, U3 to detect the polarity address of the rotor of the brushless motor M and to output the detected signal to the microprocessor 40 for further digital signal control. This design greatly reduces the size and the cost, eliminating the drawbacks of the conventional Hall sensor.
3. It allows for control of different speeds:
   As shown in FIG. 8, the speed control circuit 80 allows for setting different speeds, and the microprocessor 40 controls the operation speed of the brushless motor M subject to the setting.
4. It provides an overcurrent protection:
   As shown in FIG. 7, the current-limit protection circuit 70 automatically cuts off power supply from the microprocessor 40 when the current at the field effect power transistor QT surpassed the predetermined high level, preventing burnout.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A fan motor controller comprising:
   a power supply unit adapted to provide the necessary working voltage for component parts of the fan motor controller;
   three driving circuits electrically connected to said microprocessor, a driving circuits each having two transistors;
   three power output circuits respectively electrically connecting said driving circuits to a brushless motor, said power output circuits each comprised of a transistor and a field effect power transistor, the transistors of said power output circuits being turned on/off by means of on/off action of the transistors of said driving circuits so that the field effect power transistors of said power output circuits are turned on/off to control forward/reverse operation of said brushless motor;
   a said microprocessor adapted to receive control signals and to output control signals to said driving circuits;
   a voltage raising and compensation circuit, said voltage raising and compensation circuit being comprised of a plurality of transistors, resistors, capacitors and diodes, and adapted to raise the voltage of said power supply unit and to provide raised voltage to said driving circuits for driving said field effect power transistors;
   a back-EMF sensing circuit, said back-EMF sensing circuit being comprised of three operational amplifiers electrically connected to said brushless motor and said microprocessor to detect the polarity address of the rotor of said brushless motor and to output the detected signal to said microprocessor for digital signal control.

* * * * *